US008499032B2

(12) United States Patent
Matkowsky (10) Patent No.: US 8,499,032 B2
(45) Date of Patent: Jul. 30, 2013

(54) SYSTEM AND METHOD FOR COMPILING A SET OF DOMAIN NAMES TO RECOVER

(75) Inventor: Jonathan Matkowsky, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 343 days.

(21) Appl. No.: 12/191,854

(22) Filed: Aug. 14, 2008

(65) Prior Publication Data

US 2010/0042622 A1 Feb. 18, 2010

(51) Int. Cl.
*G06F 15/16* (2006.01)
*G06F 17/30* (2006.01)

(52) U.S. Cl.
USPC .......................................... 709/203; 707/767

(58) Field of Classification Search
USPC .......................................... 709/203; 707/767
See application file for complete search history.

(56) References Cited

U.S. PATENT DOCUMENTS

| | | | |
|---|---|---|---|
| 6,298,341 B1 * | 10/2001 | Mann et al. ............................ 1/1 |
| 6,760,746 B1 * | 7/2004 | Schneider ...................... 709/203 |
| 7,146,416 B1 | 12/2006 | Yoo et al. |
| 7,418,471 B2 * | 8/2008 | King et al. ..................... 709/203 |
| 7,548,968 B1 * | 6/2009 | Bura et al. ..................... 709/223 |
| 7,664,831 B2 * | 2/2010 | Cartmell et al. .............. 709/219 |
| 7,747,592 B2 * | 6/2010 | Thomas ......................... 707/705 |
| 2001/0021947 A1 * | 9/2001 | Kim .............................. 709/217 |
| 2002/0099693 A1 * | 7/2002 | Kofsky ............................. 707/3 |
| 2004/0103170 A1 * | 5/2004 | Borzilleri et al. ............. 709/220 |
| 2005/0125451 A1 * | 6/2005 | Mooney ...................... 707/104.1 |
| 2006/0195609 A1 * | 8/2006 | Han ............................... 709/245 |
| 2008/0195665 A1 * | 8/2008 | Mason et al. .............. 707/104.1 |
| 2008/0270203 A1 * | 10/2008 | Holmes et al. .................... 705/7 |

OTHER PUBLICATIONS

DNS and BIND, Fifth Edition; by Cricket Liu and Paul Albitz; (c) 2006, O'Reilly Media, Inc., 1005 Gravenstein Highway North, Sebastopol, CA 95472; Chapters 1-2.
http://www.alexa.com/; Alexa The Web Information Company (c) 1996-2008, Alexa Internet, Inc.
http://www.alexa.com/site/company; Alexa The Web Information Company; Company: About Alexa Internet; (c) 1996-2008, Alexa Internet, Inc.
http://www.alexa.com/site/company/technology; Alexa The Web Information Company; Company: Technology; (c) 1996-2008, Alexa Internet, Inc.
http://www.amazon.com/gp/browse.html?node=12782661; Amazon Web Services @ Amazon.com; Alexa Web Information Service (AWIS); (c) 1996-2008, Amazon.com, Inc.
http://www.nytimes.com/2008/08/06/business/media/06adco.html?_r=1&oref=slogin&ref=t; Google's New Tool Is Meant for Marketers; by Miguel Helft; The New York Times, NYTimes.com; Aug. 6, 2008 (c) 2008 The New York Times Company.

* cited by examiner

*Primary Examiner* — Asghar Bilgrami
(74) *Attorney, Agent, or Firm* — James J. DeCarlo; Greenberg Traurig, LLP (57) ABSTRACT

In one embodiment, the present invention relates to a method and system that receives a seed term, obtains a corpus of candidate terms, where each candidate term comprises the seed term or variants of the seed term, obtains network traffic information associated with each candidate term in the corpus of candidate terms, and compiles a set of domain names based on the network traffic information. Each domain name in the set comprises one of the corpus of candidate terms.

21 Claims, 8 Drawing Sheets

| Whois | | | | | |
|---|---|---|---|---|---|
| File | Query | Edit | View | Settings | Help |

IP, host, or domain: hotjobsyahoo.com — 710

Results

- hotjobsyahoo.com hotjobsyahoo.com 62.123.156.179 — 715

Domain Contact 3
  For More Information,
  Please Contact by E-mail
  Beverly Hills, CA 90210

Contact 3, Domain
  contact@test.com
  Please Contact by E-mail
  Beverly Hills, CA 90210
  +001.5553451212

NS1.MYDOMAIN.COM
  NS2.MYDOMAIN.COM

Google Page Rank: No Data
  Alexa Traffic Rank: No Data

Source: whois.dotregistrar.com 700, 720, 725

SYSTEM AND METHOD FOR COMPILING A SET OF DOMAIN NAMES TO RECOVER

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates to domain names, and more specifically provides a system and methods for compiling a set of domain names to recover.

BACKGROUND

Cybersquatters are typically people who register and use a domain name with a bad faith intent to profit from the goodwill of a trademark belonging to someone else. The cybersquatter then often offers to sell the domain name to the person or company that owns the trademark. One strategy employed by cybersquatters is to register variants of popular trademarked names.

Domain name disputes involving alleged bad-faith registration are typically resolved either by going to court or by using the Uniform Domain Name Resolution Policy (UDRP) process developed by the Internet Corporation for Assigned Names and Numbers (ICANN). A Uniform Dispute Resolution Process (also referred to as UDRP) (via ICANN) is often employed to resolve domain name disputes because this process is typically less expensive and time consuming than going to court. Either process used to recover a domain name, however, involves a cost to the trademark owner.

SUMMARY

The present invention compiles a set of domain names that a trademark owner may want to recover. The present invention further prioritizes these domain names so that the trademark owner can determine which domain names are the most valuable to recover.

In one aspect, the present invention relates to a method and system that receives a seed term, obtains a corpus of candidate terms, where each candidate term comprises the seed term or variants (e.g., misspellings) of the seed term, obtains network traffic information associated with each candidate term in the corpus of candidate terms, and compiles a set of domain names based on the network traffic information. Each domain name in the set comprises one of the corpus of candidate terms.

In one embodiment, the present invention determines whether each domain name in the set is registered, such as by performing a whois lookup of the domain name, and whether each domain name in the set is owned by the seed term owner or by another registrant. In one embodiment, the present invention determines whether an actively hosted web page resolves to each domain name in the set. If a domain name does not resolve to an actively hosted web page, then the seed term owner can be notified to serve content on the site associated with the domain name. If a domain name is not owned by the seed term owner, the seed term owner can be notified to recover the domain name (e.g., via a UDRP proceeding or by sending a cease and desist letter). In one embodiment, if the domain name is owned by another registrant (i.e., a company or individual other than the seed term owner), the present invention can determine whether there are any aggravating factors against the registrant, such as whether the registrant has other domain names, is a known cybersquatter, has been involved in other infringement cases, etc.

In one embodiment, the set of compiled domain names is adjusted based on previously compiled sets, such as by excluding a particular domain name from a set if the seed term owner is already attempting to recover that particular domain name.

These and other advantages of the invention will be apparent to those of ordinary skill in the art by reference to the following detailed description and the accompanying drawings.

BRIEF DESCRIPTION OF THE DRAWINGS

FIG. 7 is an example of a user interface screen depicting a whois query lookup for the domain name "hotjobsyahoo.com" in accordance with an embodiment of the present invention.

DESCRIPTION OF EMBODIMENTS

The present invention is now discussed in more detail referring to the drawings that accompany the present application. In the accompanying drawings, like and/or corresponding elements are referred to by like reference numbers.

Various embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the present invention.

Figure 1:
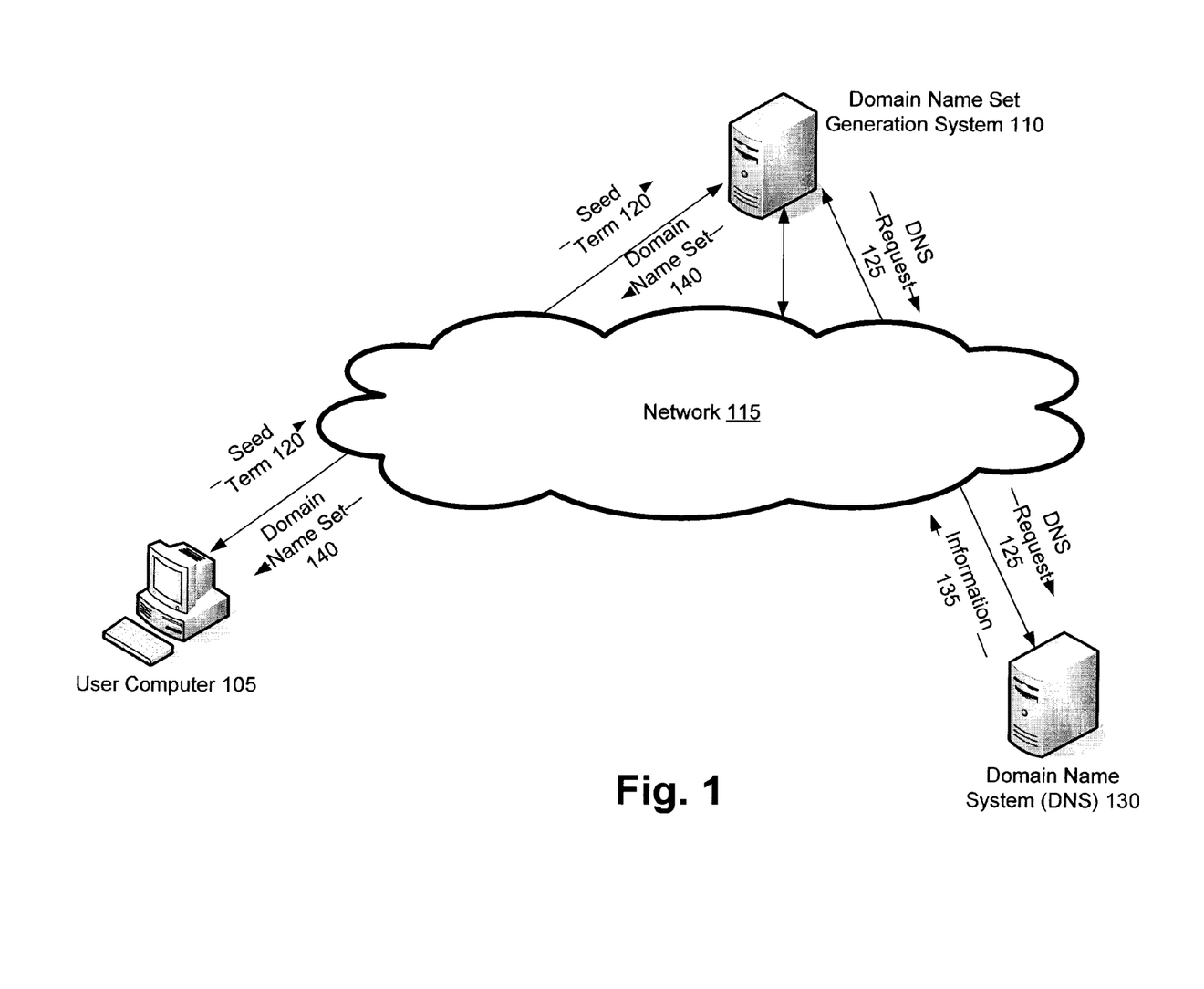
FIG. 1 is a block diagram of a domain name set generation system in communication with a user computer and a domain name system in accordance with an embodiment of the present invention.

In one embodiment, and referring to FIG. 1, a user computer 105 connects to a domain name set generation system 110 over a network 115, such as the Internet. For purposes of this disclosure, a computer such as the user computer 105 includes a processor and memory for storing and executing program code, data and software. Computers may be provided with operating systems that allow the execution of software applications in order to manipulate data. Personal computers, PDAs, wireless devices, cellular telephones, internet appliances, media players, home theater systems, and media centers are several non-limiting examples of computers.

For the purposes of this disclosure, a server such as the domain name set generation system 110 comprises software and/or hardware executing on one or more computers which receives information requests from other servers or user computers, and responds to such requests. A number of program modules and data files may be stored on a computer readable medium of the server. They may include an operating system suitable for controlling the operation of a networked server computer, such as the WINDOWS VISTA, WINDOWS XP, or WINDOWS 2003 operating system published by Microsoft Corporation of Redmond, Wash., or the Ubuntu operating system distributed by Canonical Ldt. of Douglas, Isle of Mann.

For the purposes of this disclosure, a computer readable medium stores computer data in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to store the desired information and which can be accessed by the computer.

As described in more detail below, the user of the user computer 105 employs the domain name set generation system 110 to determine one or more domain names that may interest the user of the user computer 105. As a brief introduction, domain names typically end in a top-level domain (TLD) name, which is either one of a small list of generic names (e.g., ".com") (gTLD) or a two-character territory code (e.g., ".uk") (country code top-level domain (ccTLD)). Below the top-level domains in the domain name hierarchy are the second-level domain (SLD) names. These are the names directly to the left of .com, .net, and the other TLDs. Next are third-level domains, which are written immediately to the left of a second-level domain. There can also be fourth- and fifth-level domains, and so on.

The user computer 105 transmits one or more seed terms 120 over the network 115 to the domain name set generation system 110. A seed term 120 is any combination of numbers, letters, and/or symbols (e.g., asterisk, ampersand, etc.) that is owned by a seed term owner and that can be inputted into a user computer. Non-limiting examples of a seed term 120 include a common law trademark, a registered trademark, a seed term filed by a seed term owner in a trademark application, and a seed term filed by a seed term owner in an intent to use application. An example of a seed term 120 is the term "yahoo", a trademark owned by Yahoo! Inc. of Sunnyvale, Calif. (i.e., the seed term owner). In one embodiment, the seed term owner (or a representative of or an entity acting on behalf of the seed term owner or any other entity using the system and methods described herein) is the user using the user computer 105, although no affiliation with the seed term owner is required.

The domain name set generation system 110 is a server configured to receive the seed term 120 and obtain a corpus of candidate terms. Each candidate term in the corpus includes the seed term. As described in more detail below, a candidate term is any combination of numbers, letters, and/or symbols (e.g., asterisk, ampersand, etc.) that includes the seed term 120 or some variation and that generated some level of network traffic during a predetermined period of time (e.g., the previous week). In some embodiments, the functionality associated with the domain name set generation system 110 may be provided by multiple servers to scale the system architecture to meet demand. Furthermore, some or all of the individual components of the system 110 may be provided by a separate server or group of servers.

For the purposes of this disclosure, "network traffic" refers to a count, or approximate count, of the events (hits, searches, requests, purchases, etc.) that occurred for a given subject. Network traffic can be measured either for a defined set of servers accessed by a possibly unconstrained set of user computers/users ("selected servers/all user computers"), for a defined set of user computers/users accessing a possibly unconstrained set of servers ("all servers/selected user computers"), or for a defined set of user computers accessing a defined set of servers ("selected servers/selected user computers"). For example, the selected servers might be the servers that serve content for one or more defined Web sites, the servers that are monitored by an advertising network or ratings network, the servers monitored by a university network monitoring system, etc. Network traffic is one element of a concept called "buzz" which in general means whether the item under consideration is receiving a lot of attention on a network.

"Network traffic" might be a raw count of the number of events, unnormalized or otherwise, but network traffic might also be measured not with one count per event, but one count per unique user (i.e., even if a particular user makes multiple requests, only one request is counted) or one count per unique user per time period might also be the measure of counting network traffic. Network traffic can be unnormalized, such as integer counts for the number of events, or can be normalized. One purpose for normalization is to place the number in a suitable value range for presentation or other processing. Another purpose for normalization is to normalize out variability in the counts that is likely to be variability independent of levels of user interest.

Once one or more candidate terms are obtained, the domain name set generation system 110 compiles a set of (i.e., one or more) domain names based on the network traffic information. Each domain name in the set includes one of the corpus of candidate terms. As described in more detail below, the domain name set generation system 110 transmits a DNS request 125 for information about the domain name(s) in the compiled set to a domain name system (DNS) 130.

In one embodiment, the set of domain names is a list of many domain names. In a further embodiment, the domain name set generation system 110 prioritizes the domain names in the list of domain names based on the amount of network traffic each candidate term associated with the domain name receives in a time period. In one embodiment, the domain name set generation system 110 can be configured to prioritize two-term candidate terms over three-or-more-term candidate terms, under the assumption that two-term candidate terms are more likely to be typed into someone's browser as a direct-traffic navigation query than a three-or-more-term candidate term. A direct-traffic navigation query describes when visitors land at a web site by entering a keyword or phrase (with no spaces or a hyphen in place of a space) in the web browser's address bar (and adding .com or any other generic top-level domain or country code top-level domain (as described below)) rather than, for example, following a hyperlink from another web page or performing a search using a search engine.

The domain name system 130 receives the DNS request 125 and provides information 135 about the domain name(s) to the domain name set generation system 110, such as whether each domain name in the compiled set is already a registered domain name or is available for registration. A DNS is a system that stores information, such as Internet Protocol (IP) addresses, associated with domain names. In particular, whenever a domain name is typed into a web browser, a DNS nameserver receives the request and translates the domain name into the corresponding IP address. For any group of computer hosts in the DNS system, there is likely to be a single master list of domain names and associated IP addresses. The group of computer hosts is called a zone. A zone could be a generic top-level domain (gTLD), such as ".com," or a department within a company or university. Within the zone, DNS service for subsidiary zones may be delegated. The DNS nameserver that maintains the master list for the zone is said to have authority for that zone and is called an authoritative DNS nameserver.

Aside from an authoritative DNS nameserver, DNS nameserver functions are generally divided up into two elements: a nameserver and a resolver. The nameserver responds to DNS requests or queries (submitted by the resolver) by supplying domain-name-to-IP-address conversions. When the nameserver does not know the response to the request for domain name information, the resolver will ask another DNS nameserver, such as the authoritative DNS nameserver, for the information. Resolving usually entails recursing through several DNS nameservers, possibly until the root of the DNS name space is reached, to find the needed information.

Domain name systems (e.g., domain name system 130) are typically accredited by the Internet Corporation for Assigned Names and Numbers (ICANN) to register Internet domain names. Further, each top-level domain (TLD), such as .com and .net, is maintained and serviced technically by a sponsoring organization, the TLD Registry. The registry is typically responsible for maintaining the database of names registered within the TLDs they administer. The registry receives registration information from each domain name system authorized to assign names in the corresponding TLD and publishes the information using a special service, the whois protocol.

The whois protocol is a TCP-based query/response protocol which is generally used for querying an official database in order to determine the owner of a domain name or an IP address on the Internet. Often, whois lookups are performed when a web-based client accesses a whois server. From the protocol perspective, a whois server uses TCP port 43. A whois lookup query by a user can enable the user to determine whether a domain name is registered or if the domain name is available. A whois lookup query executed for a particular domain name can also identify the owner of the domain name (typically referred to as the registrant) if the domain name is registered.

In one embodiment, the domain name system 130 can check .com domains or any other generic top-level domain or country code top-level domain. The domain name set generation system 110 then transmits this compiled set of domain names 140 to the user computer 105. The domain name set generation system 110 may also provide the information retrieved from the domain name system 130 to the user computer 105. For example, if a domain name is already registered, the domain name set generation system 110 provides this information to the user computer 105 so that the seed term owner or system user can determine whether the seed term owner wants to attempt to recover the domain name.

Figure 2:
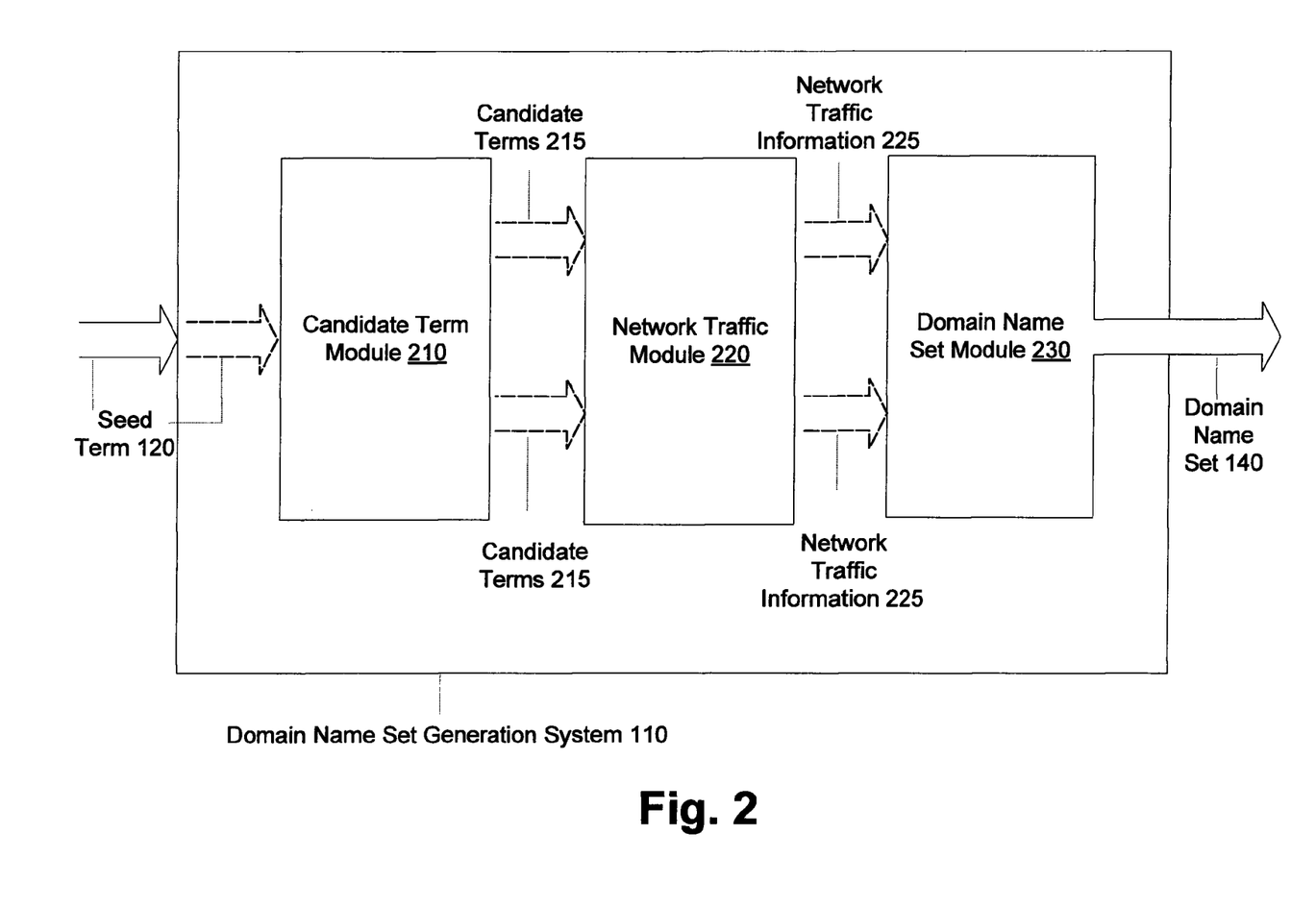
FIG. 2 is a detailed block diagram of the domain name set generation system of FIG. 1 in accordance with an embodiment of the present invention.

FIG. 2 shows a further block diagram of the domain name set generation system 110. As described above, the domain name set generation system 110 receives a seed term 120 from the user computer 105. The domain name set generation system 110 transmits the seed term 120 to a candidate term module 210.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules.

The candidate term module 210 is a module that obtains a corpus of candidate terms, where each candidate term includes the seed term 120. For example, if the domain name set generation system 110 receives, as input, the seed term "yahoo", the candidate term module 210 can use a search engine to perform a search for the term "yahoo". The candidate term module 210 analyzes the results of this search to determine one or more candidate terms 215 having the seed term "yahoo". For example, candidate terms 215 may include "yahoomail" and "yahoomusic".

These candidate terms 215 are transmitted to a network traffic module 220. The network traffic module 220 determines how much network traffic or "buzz" each candidate term 215 received for a given period of time, such as for the previous day or week. The "buzz" associated with a candidate term refers to a statistical measure of interest in the candidate term. For example, a candidate term achieving a lot of buzz refers to a candidate term that is experiencing a flurry of activity due to increased interest. The experiencing of the flurry of activity is a result of many search queries for the candidate term over a given period of time. The network traffic information 225 is then transmitted to a domain name set module 230.

The domain name set module 230 is a module that generates the set of domain names that the seed term owner may want to recover. Each domain name in the set includes one of the candidate terms 215. In particular, the domain name set module 230 generates this set based on the candidate terms 215 and the network traffic information 225 for each candidate term 215. The domain name set module 230 outputs domain name set 140 for analysis (e.g., by the seed term owner). As described in more detail below, in one embodiment the seed term owner determines which domain names in the domain name set 140 to attempt to recover.

Although described as independent modules 210, 220, 230, the functionality of each module 210, 220, 225 can be combined into a single or any number of modules. Further, the functionality of one or more of the modules 210, 220, 230 may be executed in software, hardware, and/or firmware.

Figure 3:
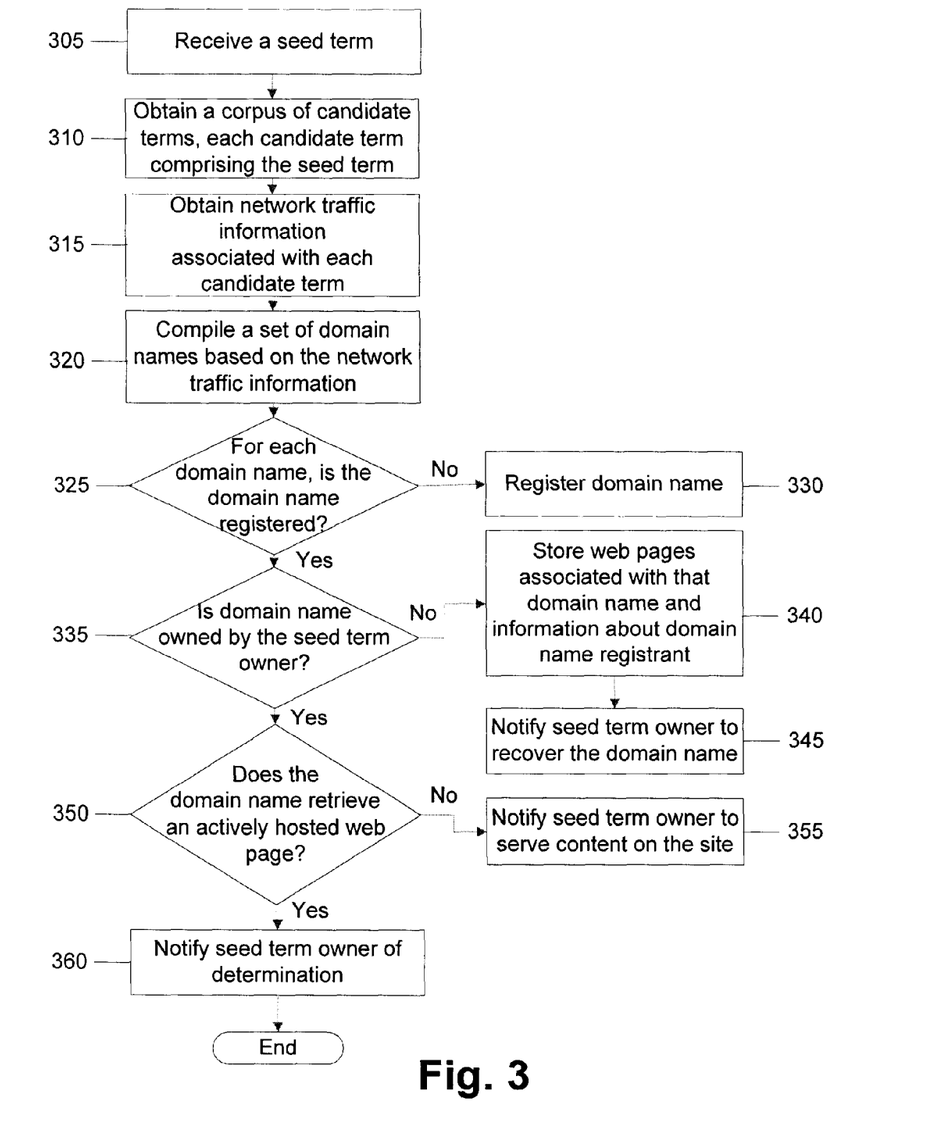
FIG. 3 shows a flowchart of the steps performed by the domain name set generation system of FIG. 2 in accordance with an embodiment of the present invention.

FIG. 3 shows a flowchart of an embodiment of the steps performed by the domain name set generation system 110. The domain name set generation system 110 (e.g., the candidate term module 210) receives, from the user computer 105, a seed term 120 in step 305.

In one embodiment, the user of the user computer 105 (e.g., the seed term owner) inputs additional information into the user computer 105 when entering the seed term 120, such as contact information (e.g., one or more of name, address, email address, IP address, etc.) for the seed term owner. This additional information can be used to verify that the person entering the seed term is in fact the legitimate owner of the seed term. The user computer 105 can then transmit this additional information to the domain name set generation system 110. In a further embodiment, the domain name set generation system 110 receives the additional information and verifies that the additional information corresponds with the owner of the seed term 120. For example, in one embodiment, the domain name set generation system 110 receives the additional information and compares the additional information to information obtained from another source, such as a state's business directory or the United States Patent and Trademark Office. In another embodiment, the system 110 determines the IP address associated with a domain name of the seed term owner and then compares this IP address to the entered IP address. The system 110 may also compare the email address supplied by the supposed seed term owner with the domain name associated with the seed term to determine if these match.

With continued reference to FIGS. 2 and 3, the candidate term module 210 obtains a corpus of candidate terms, where each candidate term includes the seed term or variants of the seed term (step 310). As described above, the candidate term module 210 transmits the candidate terms 215 to the network traffic module 220, and the network traffic module 220 determines an amount of network traffic associated with each candidate term (step 315). As described above, the network traffic module 220 transmits the network traffic information 225 to the domain name set module 230. In one embodiment, for each candidate term 215 associated with network traffic above a predetermined threshold, the domain name set module 230 identifies a set of (i.e., one or more) domain names associated with the candidate term 215 (step 320). The domain name set module 230 then determines if each identified domain name has been registered (step 325). In one embodiment, the domain name set module 230 performs a "whois lookup" query to determine if each domain name is registered. Thus, in step 325, the domain name set module 230 performs a whois lookup to determine if a domain name that includes the candidate term 215 is registered.

Figure 4:
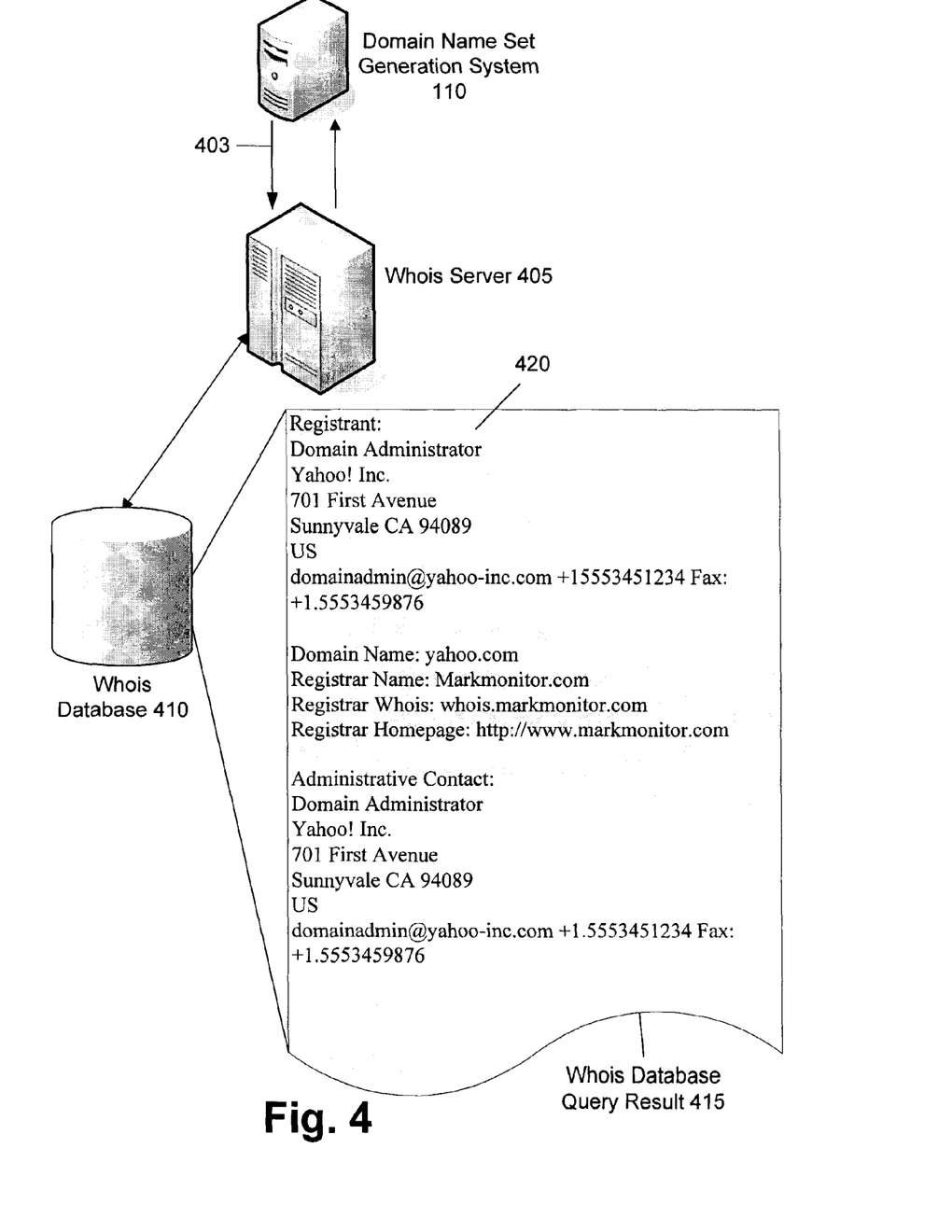
FIG. 4 is a block diagram of the domain name set generation system of FIG. 1 in communication with a whois server in accordance with an embodiment of the present invention.

Also referring to FIG. 4, the domain name set module 230 transmits a whois lookup query 403 to an authoritative whois server 405, such as, by way of non-limiting example, MarkMonitor, Inc. of San Francisco, Calif. The whois server 405 submits this query to a whois database 410. Although shown as a whois server, it should be noted that any computer (e.g., a registrar) can transmit a whois lookup query to the whois database 410. Suppose the whois query is for www.yahoo.com. The whois database 410 produces a whois database query result 415 from the lookup query. A sample whois database query result 415 is shown in FIG. 4 for www.yahoo.com. The whois database query result 415 includes, among other information, registrant information 420.

If the domain name is not registered, in one embodiment the domain name set module 230 registers the domain name in step 330. In another embodiment, the domain name set module 230 notifies the seed term owner that the particular domain name is available. If the domain name set module 230 determines that the particular domain name is already registered in step 325, the domain name set module 230 determines whether the seed term owner owns the domain name in step 335. In one embodiment, this determination is made using the results of the whois lookup query for the domain name. If the domain name is not owned by the seed term owner in step 335, the system 110 (e.g., the domain name set module 230) prints one or more of the web pages associated with that domain name to a file, and further stores (e.g., caches) information about the registrant (from the whois record) (step 340).

In step 345, the system 110 notifies the seed term owner to recover the domain name. In one embodiment, the domain name set module 230 determines, as part of step 345, whether the domain name is a good candidate for a UDRP action or for a cease and desist letter. For example, if a domain name associated with a candidate term has experienced a lot of "buzz" and is registered to someone in a foreign country, the system 110 can be configured to automatically notify a desired party, such as the person responsible for trademark protection, or a law firm, for example, to initiate a UDRP action rather than send a cease and desist letter because of the amount of buzz that the site is getting. If the domain name being investigated gets less buzz but is still important to the seed term owner, the domain name can be placed on a list of domain names that warrant a cease and desist letter. In one embodiment, the system 110 checks on this domain name at a later time (e.g., after a week or two) to determine if the domain name has moved up in traffic or buzz during this time. If so, the system 110 may then take the domain name off of the cease and desist letter list and instead notify outside counsel to begin a UDRP action.

If the system 110 determines from the whois lookup that the domain name is owned by the seed term owner in step 335, the system 110 determines if the domain name retrieves an actively hosted web page (step 350). If not, then the system 110 can notify the seed term owner to serve content on the site to maximize the traffic for the site and to maximize brand value (step 355). In particular, the system 110 can notify the seed term owner to point the domain name to a corresponding host with content on the site or to redirect the DNS records to an active host with content on the site. If the domain name does retrieve an actively hosted web page for a domain name owned by the seed term owner in step 350, the system 110 can notify the seed term owner of this determination in step 360.

For example, a user of the system 110 (e.g., the seed term owner) transmits as input the seed term "yahoo". The candidate term module 210 receives "yahoo" as input and obtains, from a search query in a search engine, one or more candidate terms that include "yahoo". For this example, suppose the candidate term module 210 obtains "yahoomail" and "yahoomusic" as results of the search query.

The candidate term module 210 transmits the identified terms 115 "yahoomail" and "yahoomusic" to the network traffic module 220. The network traffic module 220 determines the amount of buzz associated with "yahoomail" and "yahoomusic" and transmits this traffic information to the domain name set module 230. The domain name set module 230 identifies "www.yahoomail.com" and "www.yahoomusic.com" as domain names that will be investigated. For example, suppose that the domain name set module 230 performs a whois lookup for "www.yahoomail.com" and determines that this domain name is already owned by the seed term owner (Yahoo! Inc. of Sunnyvale, Calif.). Suppose the system 110 further determines that www.yahoomail.com does not retrieve an actively hosted web page. As a result, the system 110 notifies the seed term owner (in this example Yahoo! Inc.) to serve content on the site (because the domain name has a high amount of buzz) in order to maximize the seed term owner's traffic and brand value. This is useful because sometimes people or companies purchase domain names for defensive reasons, and they don't have access to the traffic logs to determine how much traffic the domain name receives because they allow a domain registrar to park the domain names in bulk on the registrar's own servers.

Continuing with this example, suppose that the domain name set module 230 also performs a whois lookup for "www.yahoomusic.com" and determines that this domain name is registered but not owned by the seed term owner. The system 110 stores any web pages associated with www.yahoomusic.com and also stores information about the domain name registrant. The system 110 may additionally notify the seed term owner that the seed term owner should take steps to recover www.yahoomusic.com because www.yahoomusic.com has an amount of buzz that corresponds to recovery.

In one embodiment, the domain name set generation system 110 determines or receives an enforcement budget associated with the seed term owner. An enforcement budget is an amount of money that a seed term owner wants to spend on recovering domain names. When a seed term owner inputs a new seed term into the system 110, the system 110 can determine how much the seed term owner has spent in the past on UDRP or enforcement proceedings and can then retrieve a list of domain names to go after in order to exhaust the enforcement budget. In another embodiment, the domain name set generation system 110 waits until a domain name is recovered before providing the next domain name to go after until the budget is exhausted.

In one embodiment, the system 110 also determines whether there are any aggravating factors against a domain name registrant. In one embodiment, the system 110 retrieves the domain name registrant's information (e.g., name and IP address) from a whois search for the domain name. The system 110 then performs a reverse whois lookup using the registrant's IP address. A reverse whois lookup is a query to determine domain names associated with an IP address. The system 110 then searches the domain names owned by the registrant for the same or related brands.

In one embodiment, the IP address belongs to a hosting company that is servicing more than one registrant. In this scenario, the system 110 can also search whois records for the registrant's email address in the whois contact information to see which other domains are associated with that email address. The system 110 can also check the name servers to see whether the domain name is owned by a hosting company or the registrant, and what other domains are on related name servers based on the distinguishing formative (e.g., NS1.Yahoo would be searched for Yahoo, and NS2 would be considered a related name server).

In one embodiment, the system 110 uses the network traffic module 220 to determine how much (if any) buzz each of these domain names have. If one or more of these domain names have more than a predetermined amount of buzz, the system 110 can notify the seed term owner to attempt to recover these domain names in one proceeding. In another embodiment, the domain names owned by the registrant are stored (e.g., for evidence). The system 110 may further weigh the buzz associated with all of the domain names owned by the registrant to see whether it should be moved up or down on the list of prioritized domain names.

In one embodiment, when the registrant for a domain name is determined, the system 110 may automatically perform a search of that registrant in UDRP and enforcement proceedings to determine whether there have been any other cases of infringement. These other cases of infringement may be provided to the client device 105 and may further be considered as evidence of bad faith intent of the registrant to profit. In one embodiment, the system 110 checks whether the registrant's name, when searched within the same paragraph as "cybersquat*" or "infring*", retrieves results that yields intelligence on the registrant, and provides that information to the user computer 105 when available.

In one embodiment, the system 110 can be programmed to search for buzz based on a combination of factors, such as if the candidate term gets fifty hits in a given day, the candidate term is considered buzz-worthy if it received 1000 hits per month, or gets a number of hits every month for at least six months in a row. In one embodiment, the system 110 checks server logs for related properties to see whether it correlates with the buzz. For example, yahoomail might have a lot of traffic, more so than another yahoo! property, so that if yahoomail is getting a lot of buzz, the system 110 checks the server logs for yahoo! mail and confirms that it should be buzz worthy.

In yet another embodiment, the system 110 is intelligent in that it learns from the domain names that are recovered. For example, if a registrant goes after a top priority domain name that gets fifty hits in a day, the server logs associated with that domain name can then be monitored after recovery to see how many people land on the corresponding domain. The system 110 can then notify users of the system 110 how many visitors are expected based on a given level of buzz in the system 110, so that a user can include terms that, when recovered as a domain name, yield a certain level of traffic. In one embodiment, the system 110 will not include particular domain names in the set of domain names after a seed term owner recovers or attempts to recover the particular domain names. For example, the system 110 may initially provide a set of domain names that includes "www.yahoomail.com" and "www.yahoomusic.com" to the seed term owner. The seed term owner can then use the system 110 to initiate enforcement proceedings to attempt to recover "www.yahoomail.com". After the system 110 begins the process to start enforcement proceedings for "www.yahoomail.com", the system 110 will not include "www.yahoomail.com" in subsequent sets of domain names provided to that particular seed term owner.

The system 110 can also be configurable. In one embodiment, the system 110 can be programmed so that the system 110 works on particular top level domain names, such as .com domain names. In another embodiment, the system 110 works on a preconfigured list of country-code top level domains or generic domains. In one embodiment, the system 110 can be programmed to retrieve .com domains until predetermined domain names (e.g., domain names deemed to be important) are recovered. After the predetermined domain names are recovered, the system 110 can then focus on .net domain names or another top level domain.

In one embodiment, the system 110 can break down results by geographic regions. Further, this can also be combined with the TLD configurations described above. For example, a seed term owner may want to see domain names to recover based on their priority in France, and the domain name list can include both .com and .fr domain names. If a domain name having the highest priority on a list is not registered in the .fr TLD, the domain name is higher on the list than a .com domain name with less buzz in that country (e.g., France). Thus, in one embodiment, the system 110 prioritizes International Domain Names (IDN) (domain names that contain one or more non-ASCII characters), so that a candidate term consisting of non-ASCII characters may be prioritized for registration as an IDN if it receives a lot of buzz.

In one embodiment, the system 110 can be programmed to provide a notification about searched domain names at a predetermined time (e.g., daily, weekly, monthly, etc.) and to provide a certain number of results at a time.

In one embodiment, the system 110 learns from the recovered domain names which terms get more traffic. The system 110 can then prioritize looking for domain names that include that term above others. For example, if yahoomail.com is listed as the top priority domain name to recover, and then, when yahoomail.com is recovered it gets a defined level of traffic, the next time a list is generated, the system 110 can search yahoomail in combination with other terms rather than just the brand "yahoo". Thus, in one embodiment, combinations of yahoomail are prioritized over lower level buzz yahoo! domain names.

In one embodiment, the system 110 can be preconfigured to search by region in terms of network traffic. Thus, if a country gets more network traffic generally, domains from that country can be prioritized over domains in a country with less network traffic. For example, suppose that most of a particular domain name's traffic comes from the U.S. Even if one term in Argentina gets the most buzz for Argentina, a domain in the U.S. with a little less buzz would be prioritized over a domain name with more buzz from Argentina (or any other less "important" country in terms of network traffic).

Figure 5:
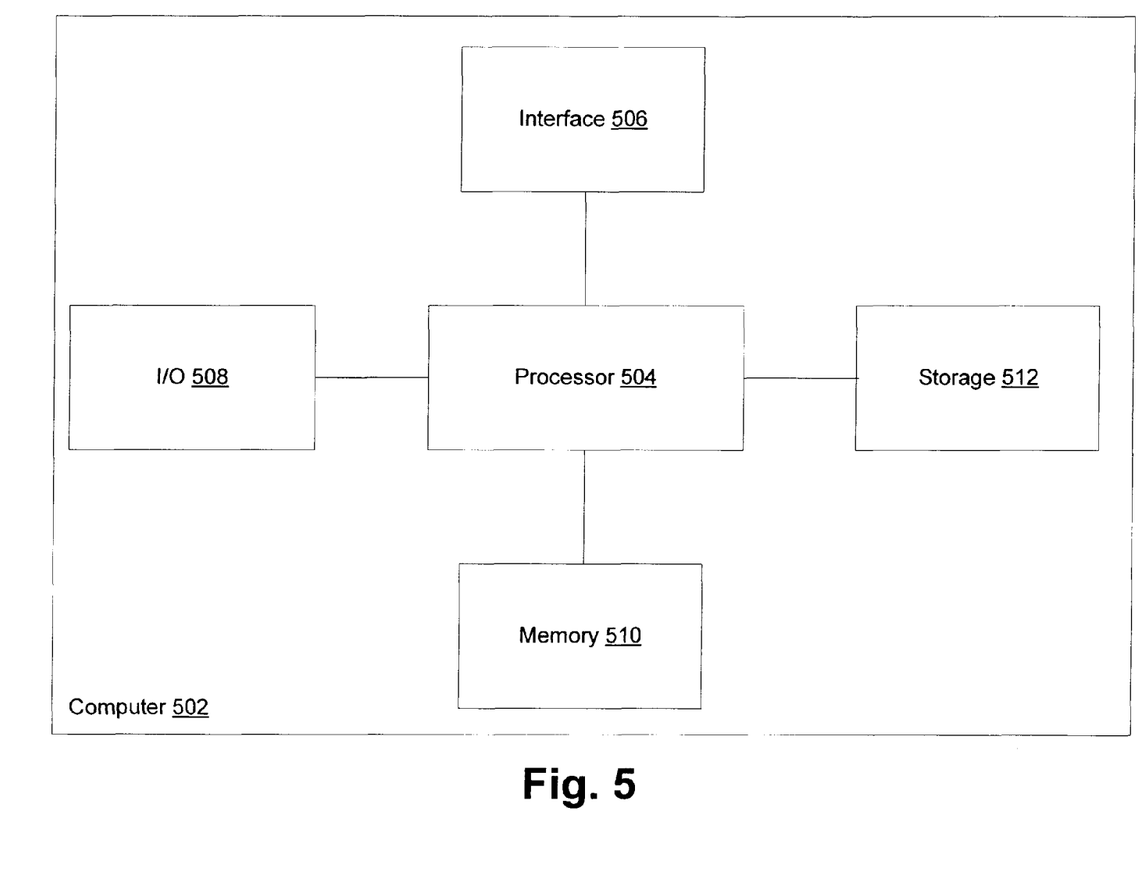
FIG. 5 is a high level block diagram of a computer in accordance with an embodiment of the present invention.

The description herewith describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 5. Computer 502 contains a processor 504 which controls the overall operation of computer 502 by executing computer program instructions which define such operation. The computer program instructions may be tangibly stored in a storage device 512 (e.g., magnetic or optical disk) and loaded into memory 510 when execution of the computer program instructions is desired. Computer 502 also includes one or more interfaces 506 for communicating with other devices (e.g., locally or via a network). Computer 502 also includes input/output 508 which represents devices which allow for user interaction with the computer 502 (e.g., display, keyboard, mouse, speakers, buttons, etc.).

One skilled in the art will recognize that an implementation of an actual computer will contain other components as well, and that FIG. 5 is a high level representation of some of the components of such a computer for illustrative purposes. In addition, the processing steps described herein may also be implemented using dedicated hardware, the circuitry of which is configured specifically for implementing such processing steps. Alternatively, the processing steps may be implemented using various combinations of hardware, firmware and software.

Figure 6:
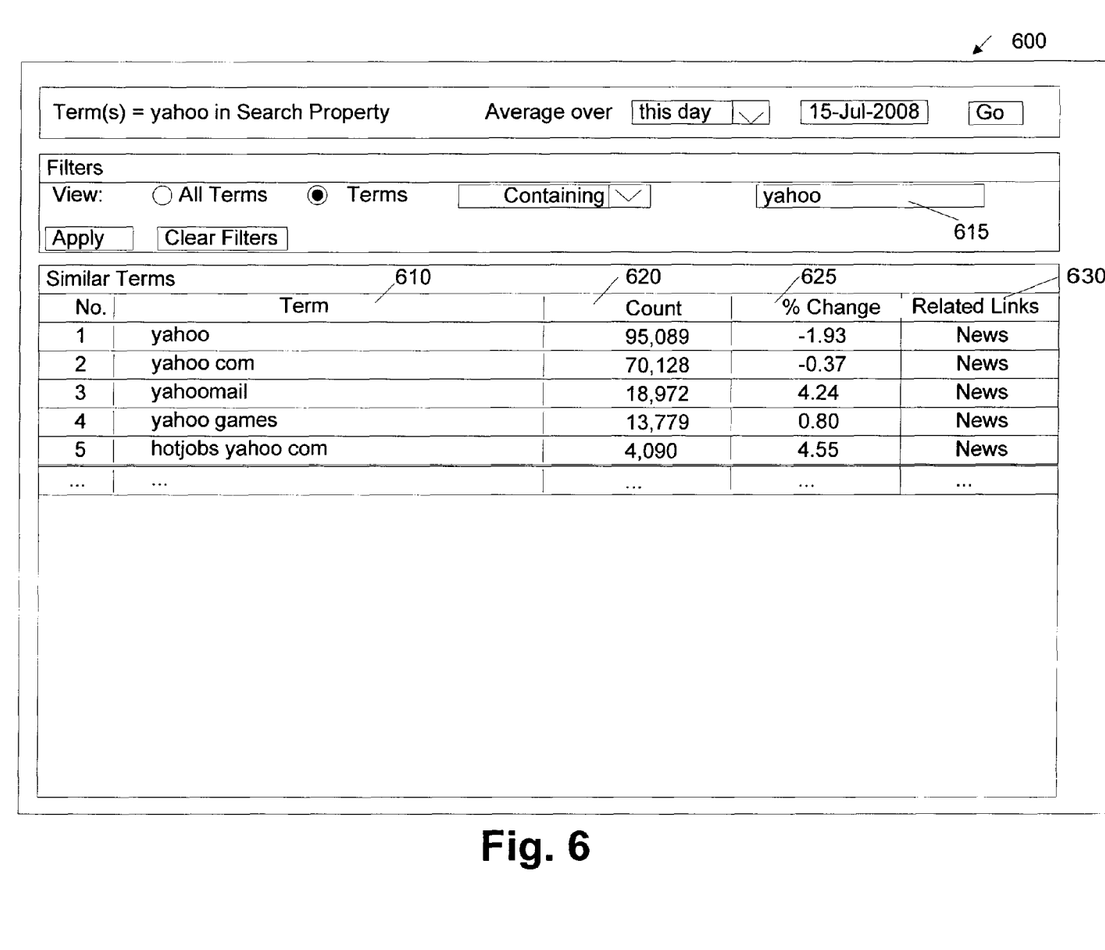
FIG. 6 is an example of a user interface screen depicting candidate terms in response to a search for a seed term in accordance with an embodiment of the present invention.

FIG. 6 illustrates an exemplary screen shot 600 of the domain name set generation system 110 providing candidate terms 610 and associated network traffic information for the seed term of "yahoo" 615 for a predetermined amount of time (e.g., one day, such as Jul. 15, 2008). As shown, the network traffic information includes counts 620. The network traffic information may also indicate the percent change 625 of each candidate term with respect to a previous amount of time (e.g., the previous week) and related links 630.

FIG. 7 illustrates an exemplary screen shot 700 of a whois query 710 for the domain name "hotjobsyahoo.com". With respect to this whois query, a user can search for an IP address, host, or domain in the whois query 710. As shown, the IP address 715 of the domain name, contact information 720, etc. is retrieved as part of the whois query result 725. In this example, Yahoo! Inc. is not the registrant and so the steps described above are executed to determine whether Yahoo! Inc. will attempt to recover hotjobsyahoo.com.

Figure 8:
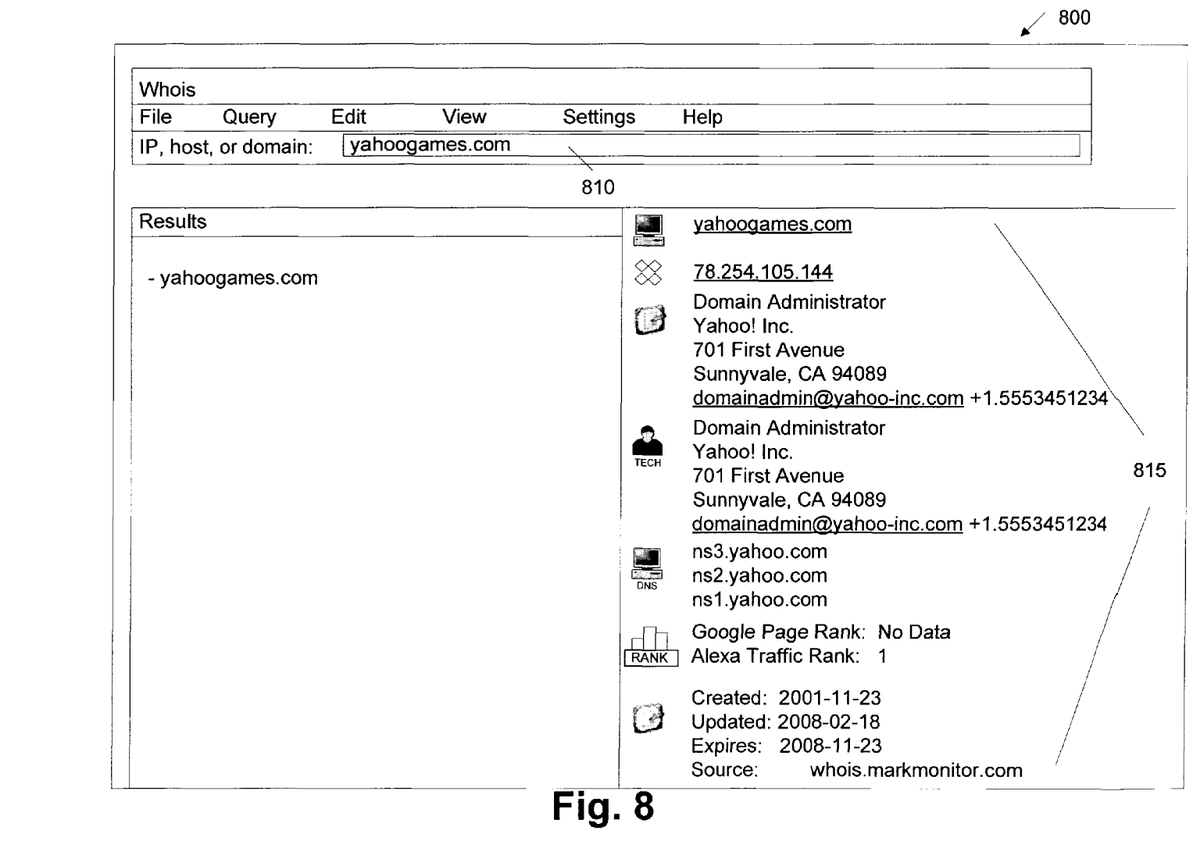
FIG. 8 is an example of a user interface screen depicting a whois query lookup for the domain name "yahoogames.com" in accordance with an embodiment of the present invention.

FIG. 8 shows an exemplary screen shot 800 of a whois query 810 for the domain name "yahoogames.com". As is shown in the whois query result 815, Yahoo! Inc. is the registrant of this domain name.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client or server or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

The foregoing Description is to be understood as being in every respect illustrative and exemplary, but not restrictive, and the scope of the invention disclosed herein is not to be determined from the Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising: receiving, by a computing device, a seed term; obtaining, by the computing device, a corpus of candidate terms, each candidate term in the corpus comprising the seed term; obtaining, by the computing device, network traffic information comprising a count of the events that occur respectively for each candidate term in the corpus of candidate terms; and for each of the corpus of candidate terms whose respective traffic information satisfies a condition: identifying, by the computing device, a set of domain names associated with the respective candidate term; determining, by the computing device, whether an actively hosted web page resolves to each of the set of domain names, wherein the set of domain names is owned by an owner of the seed term; notifying the seed term owner to serve content on a site associated with a particular one of the set of domain names, if the particular domain name does not resolve to an actively hosted web page and adjusting, by the computing device, the set of domain names associated with the respective candidate term based on an attempt to recover a domain name in a previously compiled set of domain names.

2. The method of claim 1, wherein the corpus of candidate terms further comprises candidate terms comprising variants of the seed term.

3. The method of claim 1, further comprising:
   determining, by the computing device, whether each domain name in the set is registered.

4. The method of claim 3, wherein the determining, by the computing device, that each domain name in the set is registered further comprises performing, by the computing device, a whois lookup of each domain name.

5. The method of claim 3, wherein the compiling, by the computing device, a set of domain names further comprises determining, by the computing device, whether each domain name in the set of domain names is owned by the seed term owner.

6. The method of claim 5, wherein the determining, by the computing device, whether each domain name is owned by the seed term owner further comprises notifying the seed term owner to recover a particular domain name of the set of domain names when the particular domain name is not owned by the seed term owner.

7. The method of claim 1 further comprising determining, by the computing device, that each domain name is owned by a registrant.

8. The method of claim 7 further comprising determining, by the computing device, whether there are any aggravating factors against the registrant.

9. The method of claim 2 wherein the variants of the seed term comprises misspellings of the seed term.

10. The method of claim 1 wherein the condition is that the network traffic for the respective candidate terms exceeds a predetermined threshold.

11. A system comprising: a candidate term module, executing on a computing device, configured to obtain a corpus of candidate terms from a received seed term, each candidate term in the corpus comprising the seed term; a network traffic module, executing on the computing device, configured to obtain network traffic information comprising a count of the events that occur respectively for each candidate term in the corpus of candidate terms; and a domain name set module, executing on the computing device, configured to, for each of the corpus of candidate terms whose respective traffic information satisfies a condition, identify a set of domain names associated with the respective candidate term, determine whether an actively hosted web page resolves to each of the set of domain names, wherein the set of domain names is owned by an owner of the seed term; notify an owner of the seed term to serve content on a site associated with a particular one of the set of domain names if the particular domain name does not resolve to an actively hosted web page and adjust the set of domain names associated with the respective candidate term based on an attempt to recover a domain name in a previously compiled set of domain names.

12. The domain name set generation system of claim 11, wherein the candidate term module is further configured to obtain candidate terms comprising variants of the seed term.

13. The domain name set generation system of claim 11, wherein the domain name set module is further configured to determine whether each domain name in the set is registered.

14. The domain name set generation system of claim 13, wherein the domain name set module is further configured to perform a whois lookup of each domain name.

15. The domain name set generation system of claim 13, wherein the domain name set module is further configured to determine whether each domain name in the set is owned by the seed term owner.

16. The domain name set generation system of claim 15, wherein the domain name set module is further configured to notify the seed term owner to recover each domain name if each domain name is not owned by the seed term owner.

17. The domain name set generation system of claim 11 wherein the domain name set module is further configured to determine that each domain name is owned by a registrant.

18. The domain name set generation system of claim 17 wherein the domain name set module is further configured to determine whether there are any aggravating factors against the registrant.

19. The domain name set generation system of claim 12, wherein the variants of the seed term comprises misspellings of the seed term.

20. The domain name set generation system of claim 11, wherein the condition is that the network traffic for the respective candidate terms exceeds a predetermined threshold.

21. Non-transitory computer readable storage media for tangibly storing thereon computer program instructions for a method comprising: receiving a seed term; obtaining a corpus of candidate terms, each candidate term in the corpus comprising the seed term; obtaining network traffic information comprising a count of the events that occur respectively for each candidate term in the corpus of candidate terms; and for each of the corpus of candidate terms whose respective traffic information satisfies a condition: identifying a set of domain names associated with the respective candidate term; determining whether an actively hosted web page resolves to each of the set of domain names, wherein the set of domain names is owned by an owner of the seed term; notifying the seed term owner to serve content on a site associated with a particular one of the set of domain names, if the particular domain name does not resolve to an actively hosted web page and adjusting, by the computing device, the set of domain names associated with the respective candidate term based on an attempt to recover a domain name in a previously compiled set of domain names.

* * * * *